sorption space at a temperature below the boiling point of said absorption agent to absorb the chlorosilane in said gaseous mixture in said absorption agent and heating the absorption agent containing the absorbed chlorosilane to a temperature between the boiling point of the chlorosilane and the boiling point of the absorption liquid to separate at least a substantial portion of the absorbed chlorosilane from the absorption agent.

2. The method of claim 1 which in addition comprises rinsing said absorption agent after removal of at least a substantial portion of said absorbed chlorosilane during or after the heating step with an inert gas to assist in the separation of the remainder of the absorbed chlorosilane from the absorption agent.

3. The method of claim 2 in which gases leaving the absorption space which have been separated from the chlorosilane are used as the inert rinsing gas.

4. The method of claim 3 in which the absorption agent from which the chlorosilane has been separated and the used rinsing gas is recycled to the absorption space.

5. The method of claim 1 in which the gaseous reaction mixture is a mixture of chlorosilane and hydrogen in a molar ratio of 1:2 to 1:50.

6. The method of claim 1 in which the gaseous reaction mixture is a mixture of silicon tetrachloride and hydrogen in a molar ratio of 1:2.

7. The method of claim 1 in which the absorption liquid is selected from the group consisting of paraffin oil and chlorinated paraffin.

8. The method of claim 1 in which the absorption liquid is an alkyl silicate.

9. The method of claim 1 in which the absorption liquid is a phosphoric acid ester.

References Cited
UNITED STATES PATENTS 3,114,678  12/1963  Megantz et al. _____203—57

REUBEN FRIEDMAN, Primary Examiner

R. W. BURKS, Assistant Examiner

U.S. Cl. X.R.

55—71

United States Patent Office 3,500,613
Patented Mar. 17, 1970

3,500,613
SEPARATION OF CHLOROSILANES FROM GASEOUS REACTION PRODUCTS
Harry Kloepfer, Bad Homburg vor der Hohe, and Rudolf Schwarz, Gross-Auheim, Germany, assignors to Deutsche Gold- und Silber-Scheideanstalt vormals Roessler, Frankfurt am Main, Germany
No Drawing. Filed Dec. 1, 1967, Ser. No. 687,095
Claims priority, application Germany, Dec. 2, 1966, D 51,691
Int. Cl. B01d 19/00
U.S. Cl. 55—48       9 Claims

ABSTRACT OF THE DISCLOSURE

Process for separating chlorosilanes such as silicon tetrachloride or silicochloroform from gaseous reaction mixtures, consisting of chlorosilanes in admixture with carbon dioxide and/or carbon monoxide and/or hydrogen by absorption in a liquid organic absorption agent such as paraffin oil, chlorinated paraffin, alkyl silicate or phosphoric acid ester which has unlimited miscibility with the chlorosilanes and is inert thereto at temperatures below the boiling point of the absorption liquid and which has a boiling point sufficiently above that of the chlorosilanes whereby the absorbed chlorosilanes can subsequently be recovered from the absorption agent by heating the charged agent to a temperature above the boiling point of the chlorosilane and below the boiling point of the absorption liquid which step may be combined with or followed by rinsing the mixture with an inert gas followed, if desired, by recycling of the rinsing gas.

Background of the invention

The invention relates to an improved process for the separation of chlorosilanes from gaseous reaction products such as, for example, are obtained in the chlorination or hydrochlorination of silicon, silicon alloys or silicon compounds such as silicides and (with addition of reducing agents) silicas. For simplicity's sake, the term chlorination is used herein to include hydrochlorination. In the chlorination of metallic silicon or silicides with hydrogen chloride according to the following equations:

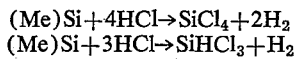

$$(Me)Si + 4HCl \rightarrow SiCl_4 + 2H_2$$
$$(Me)Si + 3HCl \rightarrow SiHCl_3 + H_2$$

either one mol of silicon tetrachloride and two mols of hydrogen or one mol of silicochloroform and one mol of hydrogen are produced.

The gas mixtures can be employed for the production of finely divided silicon dioxide by flame hydrolysis. However, in such production of finely divided silicon dioxide generally chlorosilane/$H_2$ mixtures are required of a different molar composition, such as 1:2 to 1:3, so that an increase in the hydrogen content or a decrease of the chlorosilane content in the reaction mixture cannot be avoided. Increasing the hydrogen content by the supply of pure hydrogen, however, requires that the required amount of hydrogen must be provided from a source other than the chlorination process.

In addition, it is practically impossible to adjust the output of a technical chlorination plant to that of a plant for the production of silicon dioxide without intermediate storage of the chlorination products. Intermediate storage of the gaseous mixture obtained in the chlorination process described, for example, in gasometers is impractical as the gas mixture has a dew point of 26° C. and therefore below this temperature the gas composition alters because of partial condensation of the chlorosilanes and such condensed chlorosilanes can lead to further difficulties such as pneumatic blocking of the gasometers.

As a consequence, there is a need for a partial or quantitative separation of the chlorosilanes from the reaction gases indicated.

The partial condensation of the chlorosilanes to provide a predetermined chlorosilane/$H_2$ molar ratio by cooling down the gases does not come into consideration as at 26° C., still just no chlorosilane separates out, whereas at 15° C., about 50% of the chlorosilane present in the gas phase separates out so that small uncontrollable variations in temperature lead to strong variations in the chlorosilane/$H_2$ ratio. Complete separation of the chlorosilanes by deep cooling cannot be carried out economically because of the very low temperatures of about −50° C. and lower which are required as the vapor pressure even of $SiCl_4$ at −20° C. still is 25 torr. so that at such a temperature considerable quantities of chlorosilanes would still remain in the gas phase.

Description of the invention including preferred embodiments thereof

It is the object of the invention to provide an improved process for the separation of chlorosilanes from the gaseous reaction mixtures produced in the chlorination of silicon or silica containing substances which in addition to the chlorosilanes contain carbon monoxide and/or carbon dioxide and/or hydrogen which permits either a complete separation of the chlorosilanes from the gaseous reaction products or a partial and predetermined controlled separation which renders it possible, for instance, to provide a mixture having a predetermined definite chlorosilane/$H_2$ ratio.

According to the invention it was found that this object can be achieved by passing the chlorosilane containing gaseous mixture through an absorption space countercurrently to an absorption agent, in which the chlorosilanes have unlimited miscibility, at temperatures below the boiling point of such absorption agent to absorb the chlorosilanes therein and subsequently separating the absorbed chlorosilanes from the absorption agent by heating the mixture to a temperature between the boiling point of the chlorosilanes and the boiling point of the absorption agent.

It was found that the chlorosilanes could best be separated either partially or completely from the gaseous chlorination products described by a washing process. It was further found that, of the many organic liquids which have unlimited miscibility with the chlorosilanes which come into question for the process according to the invention, the following have been found best suited: hydrocarbons, chlorohydrocarbons, especially, paraffin oil and chlorinated paraffin; silicic acid esters, such as, for example, octyl silicate or ethyl silicate, and phosphoric acid esters, for example, tricresyl phosphate.

The organic liquids mentioned have the following common characteristics required for the purposes of the invention:

(a) they are inert with respect to the chlorosilanes,
(b) they exhibit a good absorption capacity for chlorosilanes,
(c) they can be separated from the chlorosilanes by usual conventional methods,
(d) their boiling points lie sufficiently above those of the chlorosilanes,
(e) they do not decompose even after heating for longer periods of time in the presence of chlorosilanes.

The liquid mixtures of these organic liquids with the chlorosilanes therefore can be practically completely separated by simple heating. However, for this purpose it is necessary to heat to the boiling point of the liquid absorption agent so that with high boiling absorbents higher temperatures are required. For instance, when an equal mixture by weight of paraffin oil and $SiCl_4$ is heated to